July 13, 1948.  W. F. BROWN  2,444,976
ABSORPTION GLASSES
Filed April 28, 1942
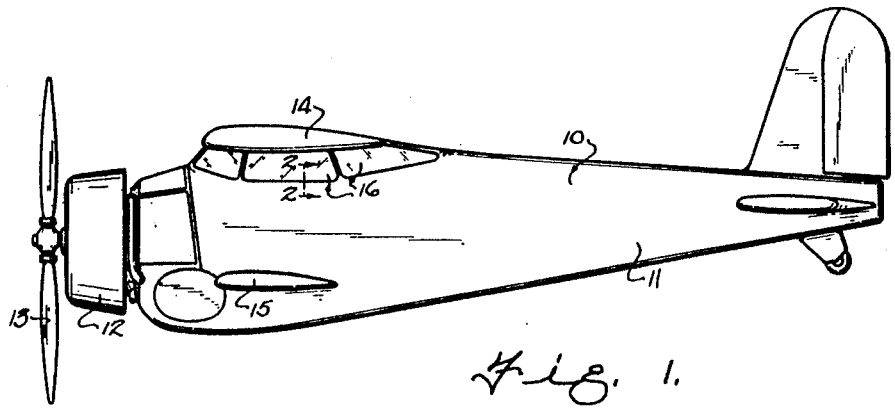
Fig. 1.
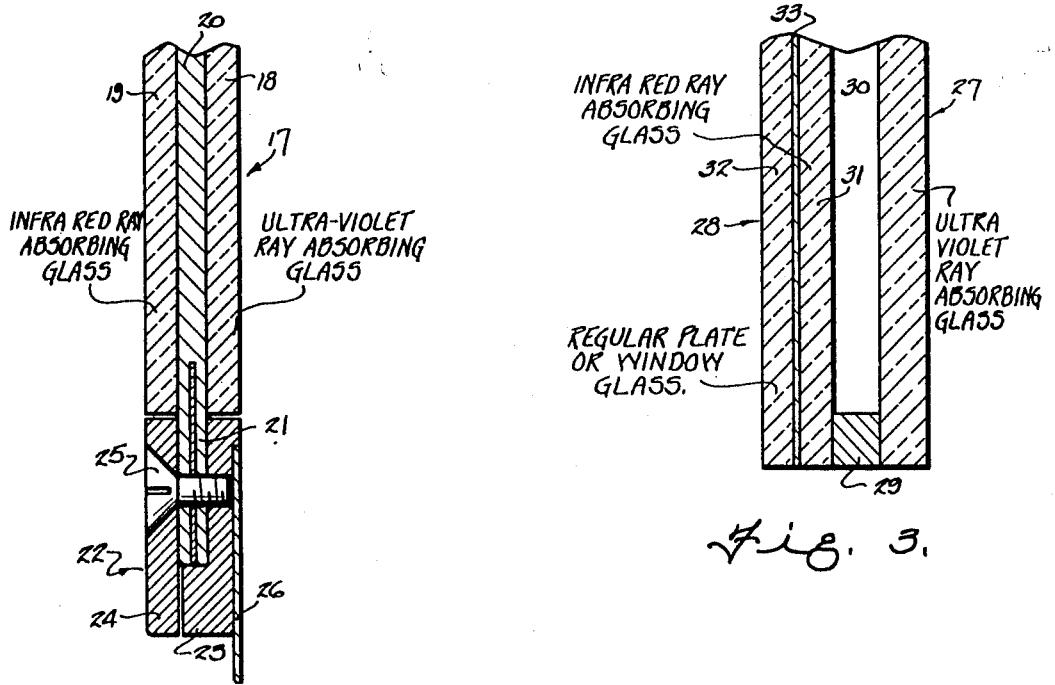
Fig. 2.
Fig. 3.
Inventor
WILBUR F. BROWN.
By
Frank Fraser
Attorney Patented July 13, 1948

2,444,976

UNITED STATES PATENT OFFICE 2,444,976

ABSORPTION GLASSES

Wilbur F. Brown, Toledo, Ohio, assignor to Libbey-Owens-Ford Glass Company, Toledo, Ohio, a corporation of Ohio Application April 28, 1942, Serial No. 440,818

2 Claims. (Cl. 20—56.5)

The present invention relates to absorption glasses which are substantially transparent in the visible region of the spectrum but which absorb strongly in the extra visual regions, such as the ultra-violet and infra-red.

More particularly, the invention is concerned with the provision of absorption glasses for use in glazing the windshields, windows and other openings in airplanes and other aircraft to protect the pilot and crew from injurious solar rays and also to effect the exclusion of solar heat from the plane.

The solar rays which tend to "burn" pilots and crew at high altitudes are the ultra-violet rays. If these can be eliminated, there is substantial physical benefit to flying personnel in that eye burns and eye strain are reduced and the discomforts of sunburned lips and face avoided. Another problem encountered when flying at high altitudes is the heating up of the interior of the plane by the infra-red rays of the spectrum.

This invention contemplates the provision of a special type glass which will cut out the ultra-violet portion of the spectrum and absorb without impairing over-all light transmission and vision. The invention also contemplates the provision of a special type glass capable of effecting the exclusion of heat from the plane to maintain it cooler while flying by absorbing radiant heat while having a relatively high light transmission.

In accordance with this invention, these special type glasses may be used singly, depending upon the rays of the spectrum to be absorbed, or they may be used in special combinations to provide a glazing unit capable of absorbing both the ultra-violet and infra-red rays.

Other objects and advantages of the invention will become more apparent from the following description when taken in connection with the accompanying drawings, wherein:

Fig. 1 is a side elevation of one type of plane with which the present invention may be used;

Fig. 2 is a transverse section through a laminated glass sheet glazing unit embodying two different absorbing glasses; and Fig. 3 is a transverse section through a double glazing unit in which a special combination of absorbing glasses is employed.

With reference now to the drawings, there is shown in Fig. 1 an airplane 10 having a fuselage 11 with a forwardly located engine 12 and propeller 13. The plane is also provided with upper and lower wings 14 and 15 and a cockpit having the transparent closures 16 which substantially completely enclose the pilot and enable him to have a wide sphere of vision. The transparent closures 16 include the windshield which is located in front of the pilot and the windows arranged along opposite sides of the plane. It will of course be appreciated that the airplane herein disclosed is simply one type of plane with which the present invention may be used and that the invention is adapted for use in aircraft of all kinds.

When it is desired to obtain protection against ultra-violet radiation only, the transparent closures 16 of the plane can consist of sheets or plates of ultra-violet absorption glass, whereas if heat exclusion from the plane is the principal problem, then sheets or plates of infra-red absorption glass may be used. On the other hand, if protection against both ultra-violet and heat radiation is desired, a combination of ultra-violet and infra-red absorption glasses may be employed.

By way of example, there is illustrated in Fig. 2 a glazing unit comprising a sheet of laminated safety glass 17 including the two sheets of glass 18 and 19 and interposed layer of thermoplastic 20 adherent thereto. The plastic interlayer 20 preferably extends beyond the edges of the glass sheets 18 and 19 to provide a flexible attaching flange 21 which may be suitably clamped in a supporting frame 22 surrounding the opening to be glazed. The frame 22 may be of any suitable construction and, as here shown, comprises the outer and inner sections 23 and 24 between which the extended plastic 21 is secured by screws or the like 25. The skin of the plane is designated at 26. In the glazing unit 17, the outer glass sheet 18 is formed of an ultra-violet ray absorption glass, while the inner glass sheet 19 is an infra-red ray absorption glass. With such a combination of glass sheets, both the ultra-violet and infra-red rays will be absorbed by the glazing unit.

In Fig. 3 is illustrated the combination of ultra-violet and infra-red absorption glasses in the fabrication of a double glazing unit. This unit comprises an outer transparent panel 27 and an inner transparent panel 28 secured in spaced parallel relation by suitable separator strips 29 to provide an insulating air space 30 therebetween. The outer transparent panel 27 preferably comprises a sheet of ultra-violet absorption glass, while the inner transparent panel consists of a sheet of laminated safety glass including the two sheets of glass 31 and 32 and interposed layer of thermoplastic 33 adherent thereto. The outer glass sheet 31 of transparent panel 28 is preferably of an infra-red absorption glass, while the inner sheet 32 may be of ordinary plate or window glass.

As illustrative of the present invention, one type of ultra-violet absorption glass which may be used comprises a soda-lime-silica glass and is produced by adding to an ordinary plate glass batch certain materials which render the finished glass capable of cutting off the ultra-violet rays while allowing substantially all of the effective luminous rays to pass therethrough. The ultra-violet cut-off materials consist of commercial cerium hydrate and commercial titanium dioxide combined with one another in predetermined relative amounts and added to the base plate glass batch during the melting thereof.

The cerium hydrate and titanium dioxide may be added to an ordinary soda-lime-silica plate glass batch or to any batch of this type which makes good quality clear flat glass. It is preferred, however, that the finished glass contain approximately 10% by weight of the combined cerium oxide and titanium dioxide which is added to the base batch in the ratio of approximately 3 parts titanium dioxide to 1 part cerium hydrate. By way of example, the following base plate glass batch may be satisfactorily used, although the invention is not limited to these particular ingredients or specific glass composition resulting therefrom.

| Base Glass Batch | | Base Glass Composition | |
|---|---|---|---|
| | Pounds | | Per cent |
| Sand | 1,000 | $SiO_2$ | 72.5 |
| Limestone | 350 | $Al_2O_3+Fe_2O_3$ | .5 |
| Soda Ash | 300 | CaO | 13.0 |
| Salt Cake | 50 | $Na_2O$ | 13.5 |
| Arsenic | 10 | $As_2O_5$ | .5 |

The above batch is an ordinary soda-lime-silica plate glass batch and adapted to be added to this batch during the melting thereof are the following ultra-violet cut-off materials:

| | Pounds |
|---|---|
| Commercial titanium dioxide | 120 |
| Commercial cerium hydrate | 40 |

The addition of these ultra-violet cut-off materials to the above base batch in the approximate amounts given will result in a finished glass having substantially the following composition:

| | Per cent |
|---|---|
| $SiO_2$ | 65.6 |
| $Al_2O_3+Fe_2O_3$ | .4 |
| CaO | 11.8 |
| $Na_2O$ | 12.2 |
| $As_2O_5$ | .5 |
| $TiO_2$ | 7.5 |
| $CeO_2$ | 2.0 |
| | 100.0 |

It will be noted that in the finished glass the $TiO_2$ and $CeO_2$ are not in the ratio of 3:1 and this is due to the fact that the commercial cerium hydrate added to the base batch contains only about 75% $CeO_2$.

The invention is also not limited to these specific percentages of titanium and cerium oxides in the finished glass, as such oxides may be purposely varied within a limited range. For instance, the finished glass may contain approximately 1.5% to 3% $CeO_2$ and approximately 6% to 9% $TiO_2$. Also, the base plate glass batch given above may be modified in different ways without changing the effectiveness of the cerium hydrate and titanium dioxide. For instance, the salt cake in the batch may be replaced by borax or part of the salt cake or soda ash may be replaced by sodium nitrate.

The inclusion of cerium and titanium in the above base glass batch results in a finished glass having a golden color and it has been definitely determined that such a glass has an exceptionally low transmission in the ultra-violet and a high transmission in the visible. Because of these characteristics, the glass is eminently suited for use in the glazing of airplanes and other aircraft because it absorbs the injurious ultra-violet radiation which tends to "burn" pilots flying at high altitudes, while at the same time allowing the effective luminous rays to pass therethrough.

In order to determine the spectral transmission of the special absorbing glass hereinabove described, sheets of this glass having a thickness of .250 of an inch were tested by using a Bausch & Lomb large Littrow Quartz Spectrograph with a Pointolite or 500 watt tungsten lamp. By such method, it was found that the glass cuts out all ultra-violet radiation below 3850 Angstrom units and from this point the transmission of the ultra-violet increases gradually to 4½% at 4000 Angstrom units. The average transmission of the glass in the ultra-violet range between 2900 and 4000 Angstrom units in approximately 0.2%. This figure was determined by the method of thirty selected ordinates for this region and was based on the energy in sunlight above the atmosphere which is equivalent to daylight (illuminant C) in the visible.

It was also found that the transmission of the glass at 5,000 Angstrom units is 75%, at 6,000 Angstrom units 89%, and at 7,000 Angstrom units 91%. By the selected ordinate method, the average transmission in the visible range between 5,000 and 7,000 Angstrom units is 83.7% for illuminant C.

As also illustrative of the invention, one type of infra-red absorption glass which may be used comprises a soda-lime-silica batch which consists substantially of a basic plate or window glass batch to which is added the desired substances or compounds, including iron oxide, to give a heat absorbing glass. For instance, if a halogen, such as chlorine or fluorine or both, is added to a basic soda-lime-silica batch, along with iron oxide, in predetermined amounts, a glass having improved heat absorbing qualities is obtained as well as one having a greater efficiency ratio value between the percent of visible transmission and the percent of total radiation transmission. In other words, the addition of the chlorine and/or fluorine to the glass batch reacts with the other ingredients and greatly improves the heat absorbing properties of the glass over a similar glass containing the same amount of iron oxide but in which the chlorine and/or fluorine are omitted. Of the halogen group (fluorine, chlorine, bromine and iodine), I prefer to use fluorine and chlorine because the sources of these materials (chlorides and fluorides) are cheaper and easier to use. However, the halogen may be introduced into the glass batch by means of the alkali metal bromides and iodides or halogen salts of other elements. The chlorine is preferably added to the batch in the form of sodium chloride (salt), while the fluorine can be added to calcium fluoride (fluorspar).

It has been heretofore proposed to introduce chlorine and fluorine into glass batches as an aid to melting and refining. However, if the amount of chloride in a glass batch is too great, seeds will be formed, while an excess of fluoride will cause opalescence. However, by maintaining these ingredients within certain definite limits, it is possible to produce a soda-lime-silica heat absorbing glass of a quality comparable with ordinary plate or window glass but having a relatively high efficiency ratio between the percent of visible transmission and the percent of total radiation transmission. It has also been discovered that the halogens affect infra-red absorption of glass containing iron oxide.

In the manufacture of heat absorbing glasses, efforts are made to keep as much as possible of the iron oxide in the ferrous state and, therefore, it is customary to add to the batch a reducing agent to obtain the necessary reduction of the iron to the ferrous state. For this purpose, the use of powdered charcoal is suggested, although carbon or any other well known reducer may be used. A relatively small amount of borax is also preferably added to the batch for easier melting.

By way of example, a typical soda-lime-silica glass batch which may be used for producing either window glass or plate glass is as follows:

| Batch: | Amounts in parts |
|---|---|
| Sand | 1,000 |
| Limestone | 318 |
| Soda ash | 276 |
| Salt cake | 50 |
| Powdered charcoal | 3 |

In making the heat absorbing glass, there is added to a basic soda-lime-silica type of batch as set forth above certain other ingredients to render the glass of a heat absorbing character without materially increasing its cost and also without impairing its quality or its melting and refining characteristics. More particularly, these added ingredients include the source of iron oxide, a metal halide consisting of sodium chloride or calcium fluoride or both, and borax. Typical heat absorbing glasses which may be satisfactorily used are as follows:

*Batch compositions*

| Batch | A | B | C | D |
|---|---|---|---|---|
| Sand | 1,000 | 1,000 | 1,000 | 1,000 |
| Limestone | 318 | 318 | 300 | 280 |
| Soda Ash | 276 | 249 | 276 | 260 |
| Salt Cake | 50 | 50 | 50 | 50 |
| Salt (Sodium Chloride) | | 30 | | 30 |
| Borax | 20 | 20 | 20 | 20 |
| Fluorspar (Calcium Fluoride) | | | 15 | 30 |
| Iron Scale | 9.54 | 9.54 | 9.54 | 8.00 |
| Powdered Charcoal | 5 | 5 | 5 | 5 |
| Percent $Fe_2O_3$ in Finished Glass | .75 | .75 | .75 | .62 |

*Transmission measurements*

| | A | B | C | D | |
|---|---|---|---|---|---|
| Thickness of Glass Tested | ⅛″ | ⅛″ | ⅛″ | ⅛″ | ¼″ |
| Transmissions: | | | | | |
| Visible | 79.8 | 79.0 | 77.0 | 76.5 | 64.5 |
| Total Radiation | 56.6 | 54.0 | 49.0 | 47.1 | 29.6 |
| Infra-Red | 37.1 | 34.8 | 28.9 | 24.9 | 8.1 |
| "Efficiency Ratio"= $\frac{Visible}{Total\ Radiation}$ | 1.41 | 1.46 | 1.57 | 1.62 | 2.18 |

It will be noted that in the above batch examples iron scale was added to give the desired amount of iron oxide in the glass, but rouge or other suitable source of iron oxide may be used. In batches A, B, and C, an amount of iron was used to calculate approximately .75% $Fe_2O_3$ in the finished glass, whereas in batch D the percentage of $Fe_2O_3$ in the finished glass was .62%. The amount of iron oxide in the finished glass, however, may vary from 0.3% to 1.2%. Salt cake and borax decrease the efficiency of a heat absorbing glass, but it is desirable to use them to get glass free from silica scum and to aid in melting and refining. When adding the chlorine and fluorine in the form of sodium chloride and fluorspar, it is preferred that the amount of soda ash and limestone used be adjusted to compensate for the sodium and calcium which is introduced along with the chlorine and fluorine.

The addition of chlorine and fluorine to a basic soda-lime-silica batch containing added iron results in a material improvement in the heat absorbing qualities of the glass and produces a glass having a greater efficiency ratio value between the visible transmission and total radiation transmission. Although it is preferred to include both the chlorine and the fluorine in the batch, either one may be advantageously used alone and results in a glass having better heat absorbing properties than if neither one were used. This is clearly shown by the above transmission measurements. Thus, ⅛ inch glass produced from batch A, which contained neither sodium chloride nor calcium fluoride, was found to have an efficiency ratio of 1.41. On the other hand, glass produced from batch B, containing sodium chloride but omitting the calcium fluoride, had an efficiency ratio of 1.46; glass produced from batch C, containing calcium fluoride but omitting the sodium chloride, had an efficiency ratio of 1.57; while glass produced from batch D, containing both sodium chloride and calcium fluoride, had an efficiency ratio of 1.62. The glass produced from batch D had an increased efficiency ratio, notwithstanding the fact that a smaller amount of iron scale was used in the batch reducing the percent of $Fe_2O_3$ in the finished glass, which clearly shows that the addition of the sodium chloride and calcium fluoride offset the smaller amount of iron oxide and resulted in a glass having a higher efficiency ratio than glasses produced from batches A, B, and C. Glass produced from batch D showed in ¼ inch thickness an efficiency ratio of 2.18.

The above transmission measurements were made with the following apparatus which was devised for comparing heat absorbing glasses of this type:

1. The source of radiation for the three types of measurements consisted of a Monoplane projection lamp operated at a color temperature of 2848° K.±20°.

2. The visible transmission of the glass specimen was measured with a photronic cell equipped with a Viscor filter.

3. The total radiation (total heat) transmission was measured by using a thermocouple receiver and a polished Jena glass filter, BG17, 2.5 mm. thick.

4. The infra-red transmission was measured by using the thermocouple receiver and a polished Corning Sextant red glass, No. 255, 3.5 mm. thick.

It is to be understood that the forms of the invention herewith show and described are to be taken as illustrative embodiments only of the same, and that various changes in the shape, size and arrangement of parts may be resorted to without departing from the spirit of the invention or the scope of the subjoined claims.

I claim:

1. A transparent closure for airplanes and the like, comprising a sheet of glass for absorbing ultra-violet rays having approximately the following composition:

|  | Per cent |
|---|---|
| $SiO_2$ | 65.6 |
| $Al_2O_3 + Fe_2O_3$ | .4 |
| $CaO$ | 11.8 |
| $Na_2O$ | 12.2 |
| $As_2O_5$ | .5 |
| $TiO_2$ | 7.5 |
| $CeO_2$ | 2.0 |
|  | 100.0 |

2. A transparent closure for sight openings to be used in airplanes or the like, including two sheets of glass arranged in parallel relationship, one of said sheets being a sheet of glass for absorbing ultra-violet rays having approximately the following composition:

|  | Per cent |
|---|---|
| $SiO_2$ | 65.6 |
| $Al_2O_3 + Fe_2O_3$ | .4 |
| $CaO$ | 11.8 |
| $Na_2O$ | 12.2 |
| $As_2O_5$ | .5 |
| $TiO_2$ | 7.5 |
| $CeO_2$ | 2.0 |
|  | 100.0 | and the other sheet being infra-red ray absorbing glass.

WILBUR F. BROWN.

REFERENCES CITED

The following references are of record in the file of this patent:

UNITED STATES PATENTS

| Number | Name | Date |
|---|---|---|
| 1,292,147 | Taylor | Jan. 21, 1919 |
| 1,292,148 | Taylor | Jan. 21, 1919 |
| 1,414,715 | Taylor | May 2, 1922 |
| 1,536,919 | Parkinson | May 5, 1925 |
| 1,545,509 | Montgomery et al. | July 14, 1925 |
| 1,572,625 | Taylor | Feb. 9, 1926 |
| 1,615,448 | Frank | Jan. 25, 1927 |
| 1,634,182 | Gell et al. | June 28, 1927 |
| 1,637,439 | Goblentz | Aug. 2, 1927 |
| 1,771,435 | Gelstharp | July 29, 1930 |
| 1,936,231 | Gelstharp et al. | Nov. 21, 1933 |
| 1,957,279 | Linke | May 1, 1934 |
| 1,971,309 | Fuwa | Aug. 21, 1934 |
| 2,009,763 | Dalton | July 30, 1935 |
| 2,009,764 | Dalton | July 30, 1935 |
| 2,035,318 | Hood | Mar. 24, 1936 |
| 2,053,244 | Turk | Oct. 1, 1936 |
| 2,143,747 | Watkins | Jan. 10, 1939 |
| 2,144,943 | Sharp | Jan. 24, 1939 |
| 2,145,930 | Herron | Feb. 4, 1939 |
| 2,219,122 | Weidert et al. | Oct. 22, 1940 |

FOREIGN PATENTS

| Number | Country | Date |
|---|---|---|
| 114,881 | Australia | 1942 |
| 281,249 | Great Britain | 1929 |
| 550,782 | Germany | 1932 |
| 673,437 | France | 1929 |

OTHER REFERENCES

Anon. Glasind. 26, No. 17/18 (1915 Chem. Abstracts, July 20, 1915, page 1981, 106–52).